（12）United States Patent
Cumming et al.

(10) Patent No.: US 9,141,165 B2
(45) Date of Patent: Sep. 22, 2015

(54) METHOD AND SYSTEM FOR CONTROLLING CLOCK FREQUENCY FOR ACTIVE POWER MANAGEMENT

(75) Inventors: Peter Cumming, Wotton-Under-Egde (GB); Hlond Marcin, Bristol (GB)

(73) Assignee: Icera Inc., Wilmington, DE (US)

( * ) Notice: Subject to any disclaimer, the term of this patent is extended or adjusted under 35 U.S.C. 154(b) by 887 days.

(21) Appl. No.: 13/130,825

(22) PCT Filed: May 29, 2009

(86) PCT No.: PCT/EP2009/056634
§ 371 (c)(1),
(2), (4) Date: Jul. 19, 2011

(87) PCT Pub. No.: WO2010/057686
PCT Pub. Date: May 27, 2010

(65) Prior Publication Data
US 2012/0023352 A1 Jan. 26, 2012

(30) Foreign Application Priority Data
Nov. 24, 2008 (GB) .................................. 0821459.5

(51) Int. Cl.
*G06F 1/00* (2006.01)
*G06F 1/32* (2006.01)

(52) U.S. Cl.
CPC .............. *G06F 1/3203* (2013.01); *G06F 1/324* (2013.01); *G06F 1/3296* (2013.01); *Y02B 60/1217* (2013.01); *Y02B 60/1285* (2013.01)

(58) Field of Classification Search
CPC ..................................................... G06F 1/3203
USPC .................................................. 713/300, 320
See application file for complete search history.

(56) References Cited

U.S. PATENT DOCUMENTS

| 5,449,562 | A | | 9/1995 | Coulon | |
|---|---|---|---|---|---|
| 5,561,664 | A | * | 10/1996 | Gilmore et al. | ............... 370/252 |

(Continued)

FOREIGN PATENT DOCUMENTS

| CN | 1532666 A | 9/2004 |
|---|---|---|
| CN | 1624626 A | 6/2005 |

(Continued)

OTHER PUBLICATIONS

Translation of JP OA dated Dec. 4, 2012, Application No. 2011-536796, 2 pages.
Foreign communication from a related counter-part application, Chinese Application No. 200980147119.9, first Chinese Office Action dated May 27, 2013.

*Primary Examiner* — Mohammed Rehman

(57) ABSTRACT

A method of controlling the clock frequency of a processor executing software in a plurality of active periods, the method comprising, for each period: supplying to a power management application at least one parameter defining an execution profile for the period having high frequency and low frequency operating intervals; the power management application determining, based on said profile, granted clock frequencies for the high and low frequency operating intervals; the processor supplying to the power management application at the commencement of a period an operating cycle requirement for the period; the power management application determining, for each period, based on the operating cycle requirement, the length of the low frequency interval; and controlling the clock frequency in each interval based on the granted clock frequencies determined by the power management application.

20 Claims, 3 Drawing Sheets

(56) References Cited

U.S. PATENT DOCUMENTS

| | | | |
|---|---|---|---|
| 6,418,310 B1* | 7/2002 | Dent | 455/418 |
| 7,230,387 B2* | 6/2007 | Feldman et al. | 315/169.3 |
| 7,498,694 B2 | 3/2009 | Luo et al. | |
| 2001/0029833 A1* | 10/2001 | Morita | 84/659 |
| 2002/0073348 A1 | 6/2002 | Tani | |
| 2006/0290289 A1* | 12/2006 | Feldman et al. | 315/169.3 |
| 2008/0056373 A1 | 3/2008 | Newlin et al. | |
| 2008/0086654 A1 | 4/2008 | Sogabe et al. | |
| 2008/0240048 A1* | 10/2008 | Okker et al. | 370/338 |
| 2008/0267160 A1* | 10/2008 | Ibrahim et al. | 370/345 |
| 2010/0057821 A1* | 3/2010 | Menkhoff | 708/300 |

FOREIGN PATENT DOCUMENTS

| | | |
|---|---|---|
| EP | 1462915 A | 3/2004 |
| EP | 1462915 A2 | 9/2004 |
| JP | 876874 A | 3/1996 |
| JP | 2000137539 A | 5/2000 |
| TW | 200801924 A | 1/2008 |
| TW | 200829031 A | 7/2008 |
| WO | 2008056293 A2 | 5/2008 |
| WO | 2010057686 A1 | 5/2010 |

* cited by examiner

METHOD AND SYSTEM FOR CONTROLLING CLOCK FREQUENCY FOR ACTIVE POWER MANAGEMENT

CROSS-REFERENCE TO RELATED APPLICATION

This application is the National Stage of, and therefore claims the benefit of International Application No. PCT/EP2009/056634 filed on May 29, 2009, entitled "ACTIVE POWER MANAGEMENT," which was published in English under International Publication Number WO 2010/057686 on May 27, 2010, and has priority based on GB 0821459.5 filed on Nov. 24, 2008. Each of the above applications is commonly assigned with this National Stage application and is incorporated herein by reference in their entirety.

TECHNICAL FIELD

The present invention relates to a method and system for controlling the clock frequency of a processor, in an active power management scheme.

BACKGROUND

The present invention lies in the field of active power management (APM) which means the short term control of processor clock frequencies and core supply voltage (Vdd) to minimise power consumption in an active mode. Active power management is generally a fast power management component, where clock frequencies and voltages may need to be modified every few hundred microseconds. Decisions are based on short term application needs.

A number of active power management schemes exist. Many such schemes which are used to find the optimum Vdd/clock frequency match assume that both parameters can be changed in a continuous manner. Such power models are not applicable in an architecture where supply voltage and/or clock frequency have a defined granularity.

It is an aim of the present invention to provide a method and system for controlling the clock frequency of a processor which can alleviate the limitations which exist where a clock frequency can only be changed with granularity.

SUMMARY

According to one aspect of the present invention there is provided a method of controlling the clock frequency of a processor executing software in a plurality of active periods, the method comprising, for each period: supplying to a power management application at least one parameter defining an execution profile for the period having high frequency and low frequency operating intervals; the power management application determining, based on said profile, granted clock frequencies for the high and low frequency operating intervals; the processor supplying to the power management application at the commencement of a period an operating cycle requirement for the period; the power management application determining, for each period, based on the operating cycle requirement, the length of the low frequency interval; and controlling the clock frequency in each interval based on the granted clock frequencies determined by the power management application.

Another aspect of the invention provides a power management system comprising: a processor adapted to execute software in a plurality of active periods; a power management application operative to receive parameters defining an execution profile for each period having high frequency and low frequency operating intervals and to determine high frequency and low frequency clock rates for the intervals; and means for supplying a clock signal to the processor at a frequency determined by the power management application, wherein the processor is operable to supply to the power management application at the commencement of a period an operating cycle requirement for the period, and wherein the power management application is operable to determine for each period based on said parameters and the operating cycle requirements, the length of the low frequency interval.

Embodiments of the invention described herein are particularly suitable for an architecture where the clock frequency choice is limited by its granularity—in particular in an architecture where the clock is generated by a high frequency phase-locked-loop (PLL) output divided by a divisor. In that case, the divisor is output from the power management application to the clock means.

In a preferred embodiment of the invention, the power management application also determines a supply voltage for the high frequency and low frequency operating intervals. In a particularly preferred embodiment, a selection is made between first and second predetermined supply voltages for the high frequency and low frequency operating intervals respectively.

Embodiments of the invention are particularly suitable for a processor which is running a wireless modem application to implement a soft modem. The MIPS (mega instructions per second) characteristic of a modem application is not flat (the average MIPS required is lower than the maximum MIPS required when some intensive activity must be completed quickly). If the clock frequency of the processor (and consequently the supply voltage), are not varied during application execution, there can be long periods of inactivity. As it is more power-efficient to do the same job at a lower clock frequency compared to doing it more quickly but at a higher clock frequency, and then going idle, the power management application described herein aims to minimise inactivity periods.

Embodiments of the invention described herein encompass an architecture in which there are two processors, one which executes real time code with regular execution patterns such as wireless modem applications, and another which resembles a more general purpose processor.

The invention is particularly suitable for the slot-based activity in a wireless modem when information is transmitted in a wireless communication system and needs to be processed on a slot basis. Such systems include GSM or UMTS systems. In such a case, a period can be aligned with a slot.

Described embodiments of the invention provide the advantage that the speed of automatic power management (APM) switching can be very fast, less than milliseconds.

In the following embodiments, clock frequency is subject to two-level control inputs to vary the frequency.

Each "mode" has an APM (execution) profile (as opposed to just a single frequency) which defines a nominal high/low speed split within the APM period: this provides initial MIPS tuning.

The nominal high/low split is then varied on a slot-by-slot basis to provide very fine, dynamic MIPS control.

A parallel, but connected voltage variation—i.e. in addition to, but partially in response to, frequency variation—gives tight interaction with voltage tracking software (AVS) to provide reliable voltage settings for both high and low portion of the APM period.

BRIEF DESCRIPTION

For better understanding of the present invention and to show how the same may be carried into effect, reference will now be made by way of example to the accompanying drawings in which.

DETAILED DESCRIPTION

Figure 1:
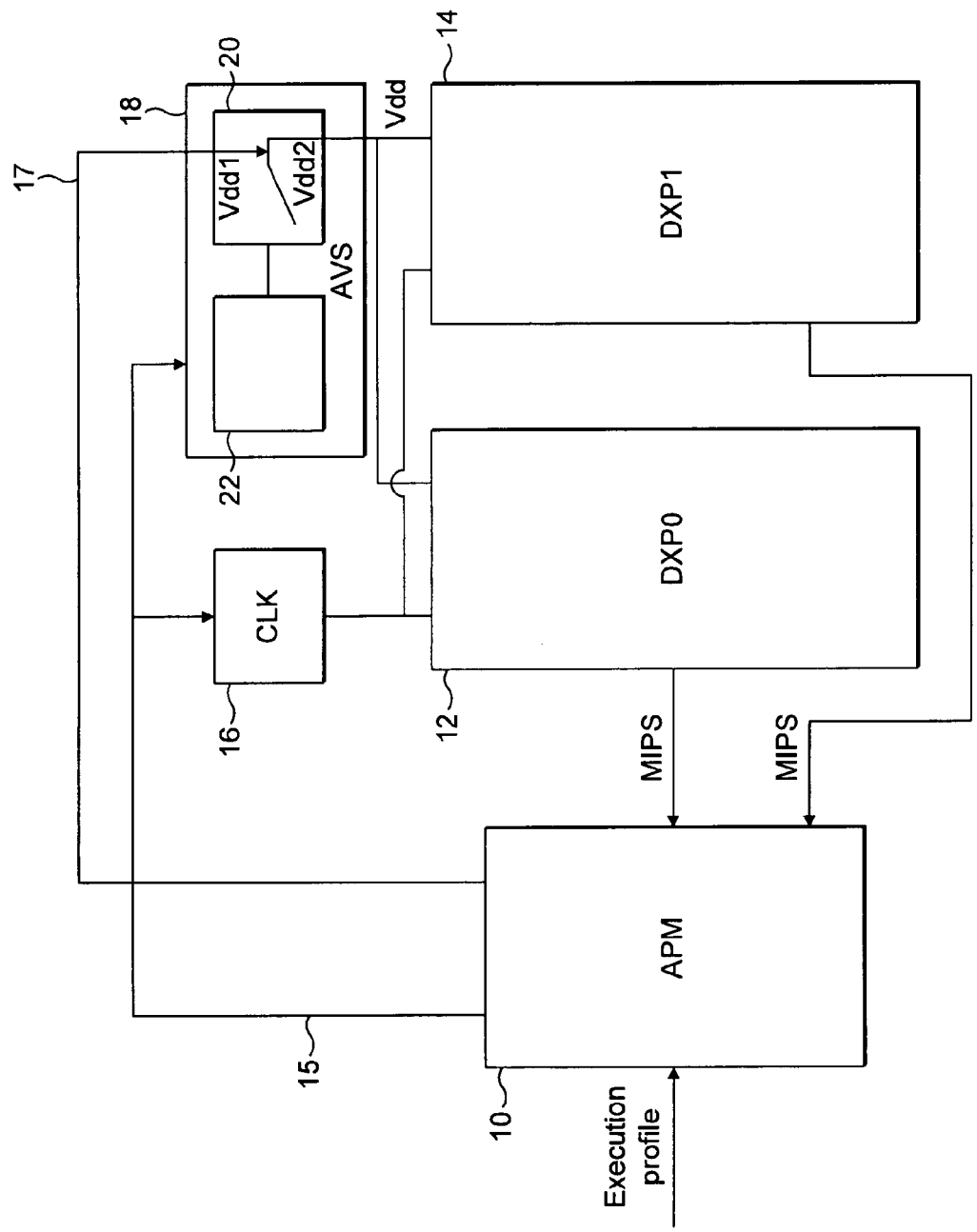
FIG. 1 is a schematic block diagram of a processor architecture using active power management.

Referring to FIG. 1 a schematic block diagram of a processor architecture using active power management is shown. For clarity certain elements of FIG. 1 are presented as separate blocks in the block diagram denoted by function. It will readily be appreciated that these elements may in fact be software applications run on one or more processors in the architecture.

An active power management application (APM) 10 runs on a first processor DXP0 12. The APM 10 is configured to receive operating cycle information in the form of MIPS from processor DXP0 12. APM 10 is also configured to receive parameters defining an execution profile. In particular embodiments of the invention the execution profile data is supplied to APM 10 by applications running on processor DXP0 12. A further processor DXP1 14 is also illustrated.

The processor DXP1 14 has no execution profile—it is assumed to operate as a general purpose processor, and can request a required operating frequency (referred to herein a MHz) on demand. The processor DXP0 12, however, handles real-time applications of a "periodic" nature. Its clock demands are discussed in the following.

A clock frequency control output 15 from APM 10 controls a processor clock (CLK) 16. The clock 16 generates a clock signal for processor DXP0 12 and processor DXP1 14 at a frequency controlled by the APM 10. A voltage control output 17 from APM 10 controls a function 20 within an AVS (automatic voltage supply) function 18 which selects a supply voltage from first and second preset levels, Vdd1, Vdd2. The selected setting, Vdd1 or Vdd2 sets the supply voltage of processors DXP0 12 and DXP1 14.

The AVS 18 has a function 22 (full path function) which sets the levels of Vdd1 and Vdd2, for example to track temperature, in addition to the select (fast path) function 20 for selecting between the individual settings.

In operation execution profile data is supplied to APM 10. The execution profile data may be supplied to APM 10 by processor DXP0 12.

Execution profiles define how the need for clock frequency (MHz) of processor DXP0 12 changes over the entire profile timespan. The behaviour of processor DXP0 12 is assumed to be periodic. In this context a period is a time during which intense processing activity is required, followed by a lull. An example is a UMTS slot of data in a wireless communication system, a UMTS slot being 666 microseconds long. The period is assumed to be "short", which means it is not possible to change supply voltage Vdd 18 many times in a period because of the change latency and APM overhead.

Execution profiles are mode-specific. Consequently there may be separate profiles for e.g. UMTS and GSM modes. The software of APM 10 allows the active profile to be changed when the wireless modem mode changes (e.g. UMTS/GSM, but also UMTS voice/UMTS high speed data.

Figure 3:
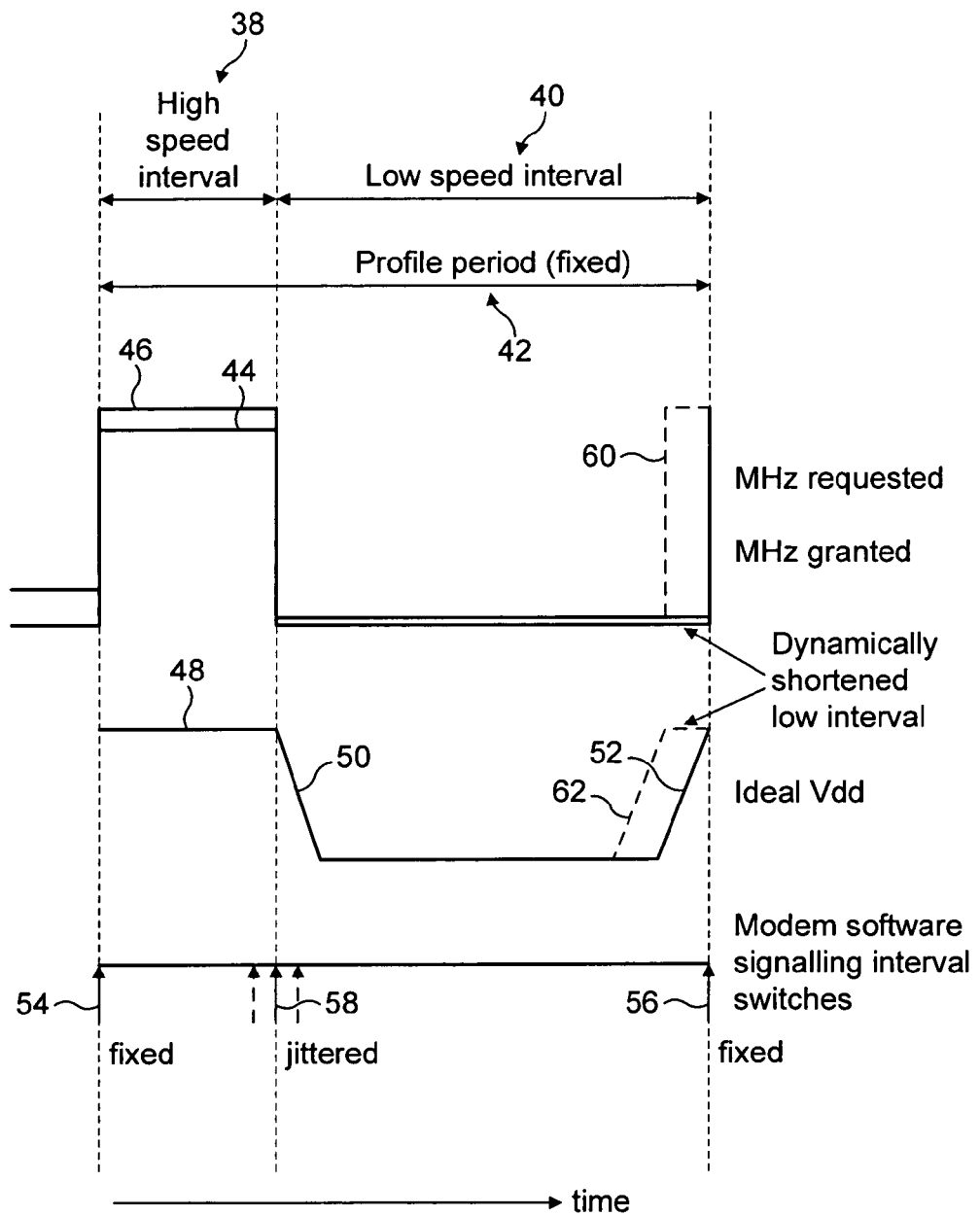
FIG. 3 is an exemplary schematic execution profile for a processor.

According to the described embodiment, an execution profile is composed of two parts only: high speed (high frequency) and low speed (low frequency) intervals. It is recognized that the needs of APM 10 may not be easily expressed in terms of such a simple model, so additional flexibility is allowed: the application may ask to shorten the low frequency interval in each profile period as shown in FIG. 3 and discussed below.

An execution profile includes the following information, which may be provided to APM 10 in the form of parameters:
  The requested clock frequency for the high frequency interval;
  The minimum length of the high frequency interval in microseconds;
  The length of the entire execution profile period; and
  The average clock frequency the application needs.

The APM 10 is then able to derive further information for each execution profile based on the execution profile data supplied to it. The derived data may include:
  The granted clock frequency for the high frequency interval;
  The granted clock frequency for the low frequency interval; and
  The nominal high frequency interval length.

In the process of selecting "granted" frequencies, required MIPS from the processor DXP1 14 can be requested (in addition to the parameters from the profile) is taken into account; in this way DXP1 can modulate a profile-based "granting procedure".

The granted MHz for the high frequency interval will usually, i.e. under normal operating conditions, be higher than the requested MHz. This is due to the granularity of the clock 16. In the described embodiment, the clock signal is generated by a phase locked loop (PLL) with the frequency controlled by a divisor.

The granted MHz for the low frequency interval and the actual nominal high frequency interval length may be selected to satisfy an average MHz request. They may also take into account the granularity of the clock 16.

The granted MHz for the high and low frequency intervals remain constant for a given mode. The AVS function 18 receives the granted MHz on line 15 and uses them as a reference MHz to adapt two Vdd settings, Vdd1 and Vdd2. This is explained further below.

The granted MHz for the low frequency interval cannot be higher than the granted MHz for the high frequency interval. They are allowed to be the same. This is guaranteed by the clock frequency granting procedure. The length of the low frequency interval can be modified in dependence on the application (modem software) executing on the processor DXP0 12.

That is, because the MIPS required by processor DXP0 12 for the low frequency interval may differ on period by period basis, the modem software is configured to allow the passing of this information to APM 10 at the commencement of each period (actually on every high frequency to low frequency transition). The APM 10 may then decide, if necessary, to bring forward the subsequent low frequency to high frequency transition, or to suppress the low interval completely for the current period, to give the modem software more MIPS. This feature can be viewed as a type of PWM (Pulse Width Modulation), enhancing the basic two-interval periodicity.

Profile interval switches, i.e. switches from high frequency interval to low frequency interval and vice-versa, involve modifying the clock frequency and selecting the supply voltage between Vdd1/Vdd2.

The clock frequency is modified by changing the clock divisors sent from APM 10 to CLK 16. This configuration requires no reprogramming of the phase lock loop used to generate CLK 16, and is therefore very fast.

Voltage change is implemented herein by programming two Vdd settings for the core voltage (full path) and switching between them using a dedicated input signal 17 (fast path). Actual programming of two Vdd settings can be done by the AVS application running on processor DXP1 14, while APM 10 just selects one of two settings using fast toggling of a dedicated hardware signal.

There is latency between when select function 20 that controls the output of AVS 18 is switched and when the selected Vdd reaches the desired voltage level.

Because of the Vdd latency, change events of Vdd 18 are scheduled before a frequency change when changing to higher frequency and voltage to ensure that the Vdd is suitable for a higher frequency.

There are two cases to consider when transitioning between intervals during an execution period:

Low frequency→high frequency interval switch. First Vdd 18 must be increased and only after sufficient delay CLK 16 may be increased. This may be performed as a two-step operation, unlike reducing Vdd/frequency. Voltage change will be scheduled to occur before switching to the high frequency interval. Clock frequency switch will be scheduled to occur exactly when required.

High frequency→low frequency interval switch. First CLK 16 should be reduced and then Vdd 18 can be decreased. This may be done on demand, i.e. when the modem software signals that the high interval has been completed.

Figure 2:
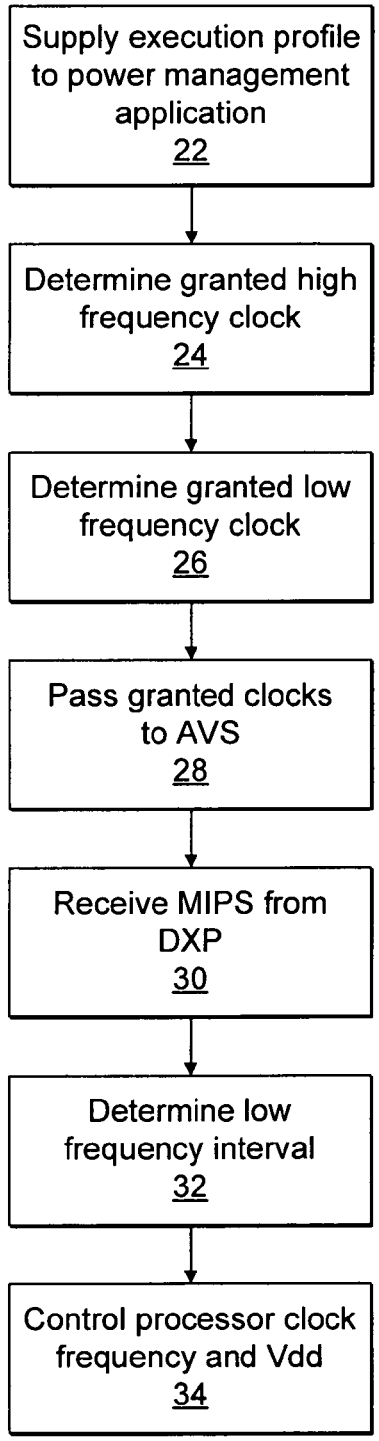
FIG. 2 is a schematic flow diagram of a sequence of steps for active power management in a processor.

Referring to FIG. 2, a schematic flow chart is shown outlining a sequence of steps for active power management of a processor. An execution profile is supplied to APM 10 at step 22. The execution profile comprises parameters as discussed above, and defines high frequency and low frequency operating intervals for an active period.

Based on the execution profile supplied, APM 10 determines the granted high frequency clock (step 24) and the granted low frequency clock (step 26), taking into account MHz requirements of DXP0 14 and clock granularity.

In step 28, APM passes granted clocks to AVS.

At step 30 there is also supplied to APM 10, at the commencement of a period, an operating cycle requirement for the period, determined by the modem software. The operating cycle requirement may be provided by processor DXP0 12. Exemplary operating cycle requirements herein may be in the form of required MIPS. The length of the low frequency interval may be calculated based on the operating cycle requirement by APM 10 at step 32.

Calculation of the length of the low frequency interval is undertaken following an assessment of whether the high frequency interval has undergone a "jittery" transition. APM 10 determines the length of the low interval every period based on the MIPS required in this period and the actual time of the "jittery" high to low transition.

For effective, integrated power management, in the described embodiment of the invention the granted high frequency and low frequency clocks are supplied to the AVS function 18. The AVS may use this clock information to adapt the settings of Vdd1 and Vdd2 as described above.

At step 34 APM 10 controls CLK 16 by providing divisors to divide the clock signal provided to the phase lock loop that generates the processor clock signal. Vdd is controlled as explained above. Steps 30, 32, 34 are performed repeatedly in a loop.

The following is a possible algorithm which may be used to implement the invention:

```
Inputs:
    Requested high MHz (HighMhzReq)
    Requested average MHz (AvgMhzReq)
    Execution profile length (ProfileLen)
    Minimum high interval length (MinHighLen)
    Requested DXP0 MHz (Dxp0DirectReq)
    Requested DXP1 MHz (Dxp1DirectReq)
    Minimum settable MHz (MinMHz)
    PLL out MHz (PllMhz)
Outputs:
    Granted high MHz (GrantedHighMhz)
    Granted low MHz (GrantedLowMhz)
    Nominal high interval length (NominalHighLen)
    Nominal low interval length (NominalLowLen)
    Granted MHz when APM inactive (GrantedDirectMhz)
Functions:
    FindLowerSettableMHz(mhz): PllMhz/CEILING(PllMhz/mhz)
    FindHigherSettableMHz(mhz): PllMhz/FLOOR(PllMhz/mhz)
    IsLowIntervalPwm(...): selects flat/PWM low interval
Algorithm:
    GrantedDirectMhz = MAX(Dxp0DirectReq, Dxp1DirectReq, MinMhz)
    ModulatedHighMhzReq = MAX(HighMhzReq, Dxp1DirectReq,
      MinMhz)
    GrantedHighMhz = FindHigherSettableMHz(ModulatedHighMhzReq)
    MaxLowLen = ProfileLen – MinHighLen
    Dxp1DirectReqRemaining = GrantedHighMhz –
      (GrantedHighMhz – Dxp1DirectReq) * ProfileLen / MaxLowLen
    LowMhzReq = HighMhzReq –
      (HighMhzReq – AvgMhzReq) * ProfileLen / MaxLowLen
    ModulatedLowMhzReq = MAX(LowMhzReq,
      Dxp1DirectReqRemaining)
    LowSettableMhzHigher =
      MAX(FindHigherSettableMHz(ModulatedLowMhzReq), MinMhz)
    LowSettableMhzLower =
      MAX(FindLowerSettableMHz(ModulatedLowMhzReq), MinMhz)
    LowIntervalPwm = IsLowIntervalPwm (...)
    GrantedLowMhz = LowIntervalPwm ?
                    LowSettableMhzLower : LowSettableMhzHigher
    LowLen = MaxLowLen * (GrantedHighMhz –
                          ModulatedLowMhzReq) / (GrantedHighMhz –
                          GrantedLowMhz)
    NominalLowLen = LowLen < MaxLowLen ? LowLen : MaxLowLen
    NominalHighLen = ProfileLen – NominalLowLen
```

The above algorithm above is capable of reducing the low interval length but cannot extend it. However, alternatives are possible where the low interval length is extended.

The algorithm is included for illustration purposes only. The scope of the invention is intended to cover the use of alternative algorithms that implement the invention as described in the accompanying claims. Alternative algorithms may accommodate additional factors.

The APM 10 user may request dynamically (on a period by period basis) that the low frequency interval length is extended or shortened (if possible) from its nominal value depending on the estimation of its momentary clock frequency needs.

Referring to FIG. 3 an exemplary schematic for an execution profile is shown. Time is shown on the horizontal axis. The high frequency interval 38 and the low frequency interval 40 are clearly shown as comprising the entire profile period 42.

FIG. 3 also shows the requested clock frequency 44 for the high and low frequency intervals, and the granted clock frequencies 46 for the high frequency and low frequency intervals. The Vdd trace 48 is also shown and demonstrates the Vdd latency 50 during transition from high frequency interval to low frequency interval, and the Vdd latency 52 during transmission from the low frequency interval to the high frequency interval.

The start 54 of the profile period 42 and the end 56 of the profile period 42 are fixed, as already stated above. However, the transition from high frequency interval to low frequency interval may suffer from jitter 58. It can therefore be seen in FIG. 3 that the length of the low frequency interval 40 may be altered 60, 62 to accommodate this and improve power efficiency by extending the low interval.

It will be appreciated that the active power management described above is particularly suited to "periodic" software, that is for example processing slot-based data in a wireless communication system, or in other situations where the data processing is "bursty". In other circumstances, the processor DXP0 12 should be allowed to request MHz in a normal manner, as the processor DXP1 14. The architecture can be setup so that if an execution profile is selected, any direct request from the processor DXP0 12 for MHz is ignored. The processor DXP0 12 could be told to "unselect" the execution profile, in which case the direct MHz request becomes valid. If no profile is selected, and neither of the processors request MHz, a minimum MHz will be selected.

MHz requests by the processors DXP1 14 and DXP0 12 (either direct or profile-based) are combined in the APM 10 and passed to the AVS function 18, which tracks the supply voltage Vdd for the combined MHz request.

While in the above described embodiment only the length of the low frequency interval is modified based on the MIPS requirement received at the commencement of a period, it would be possible also to tune the granted clock frequencies at that point.

The invention claimed is:

1. A method of controlling the clock frequency of a processor executing software in a plurality of active periods, the method comprising:
   supplying to a power management application at least one parameter defining an execution profile for each period having high frequency and low frequency operating intervals;
   the power management application determining, based on said profile and a granularity of a clock, granted clock frequencies for the high and low frequency operating intervals;
   the processor supplying to the power management application at the commencement of a period an operating cycle requirement for the period;
   the power management application determining, for each period, based on the operating cycle requirement, the length of the low frequency interval; and
   controlling the clock frequency in each interval based on the granted clock frequencies determined by the power management application and the granularity of the clock.

2. A method according to claim 1, wherein the power management application further controls a supply voltage for the processor.

3. A method according to claim 2, wherein the power management application is arranged to control the supply of one of first and second predetermined supply voltages to the processor in the high frequency and low frequency operating intervals respectively.

4. A method according to any claim 1, wherein a period is a timeslot for information transmitted in a wireless communications system.

5. A method according to claim 1, wherein the execution profile is specified for each mode of operation of the processor.

6. A method according to claim 5, wherein the modes of operation of the processor are based on communication modes in a wireless communication system.

7. A method according to claim 1, wherein parameters defining the execution profile comprise at least one of:
   a high frequency clock rate for the high frequency operating interval;
   a minimum length for the high frequency operating interval;
   a length of the period for the execution profile; and
   an average clock frequency for the period.

8. A method according to claim 1, wherein the operating cycle requirement supplied by the processor at the commencement of a period is determined in MIPS.

9. A method according to claim 1, wherein the granted clock frequency determined by the power management application for each interval depends on a granularity of a clock supplying a clock signal to the processor.

10. A method according to claim 1, wherein a further processor is arranged to supply to the power management application an operating cycle requirement, which is taken into account by the power management application in determining for each period the length of the low frequency interval and the granted clock frequency for each interval.

11. A power management system comprising:
   a processor adapted to execute software in a plurality of active periods;
   a power management application configured to receive parameters defining an execution profile for each period having high frequency and low frequency operating intervals and configured to determine the granted clock frequency for each interval based on the execution profile and a granularity of a clock; and
   means for supplying a clock signal based on the granted clock frequency and the granularity of the clock to the processor at a frequency determined by the power management application;
   wherein the processor is configured to supply to the power management application at the commencement of a period an operating cycle requirement for the period, and wherein the power management application is operable to determine for each period based on said parameters and the operating cycle requirements, a length of the low frequency interval.

12. A system according to claim 11, comprising means for supplying a voltage to the processor, said voltage being controlled by the power management application.

13. A system according to claim 12, wherein said voltage supplying means is configured to apply one of first and second predetermined voltages for the high frequency and low frequency operating intervals respectively.

14. A system according claim 11, comprising a further processor arranged to receive a clock signal from said clock means and further configured to supply to the power management application an operating cycle requirement which is taken into account when determining the granted clock frequencies.

15. A power management system comprising:
   a processor configured to execute software in a plurality of active periods;
   a power management application coupled to the processor and a clock, the power management application configured to:
      receive at least one parameter of an execution profile for each period having high frequency and low frequency operating intervals;

determine, based on the execution profile and a granularity of the clock, granted clock frequencies for the high and low frequency operating intervals;

receive from the processor, at the commencement of a period, an operating cycle requirement for the period;

determine, for each period, based on the operating cycle requirement, a length of the low frequency interval; and control a clock frequency and a supply voltage for the processor in each interval based on the granted clock frequencies; and an automatic voltage supply configured to set the supply voltage based on the granted clock frequencies.

16. The Power management system according to claim 15, wherein the operating cycle requirement is in the form of MIPS.

17. The power management system according to claim 15, wherein the supply voltage includes first and second voltage levels for the high frequency and low frequency intervals, respectively.

18. The power management system according to claim 15, wherein the automatic voltage supply includes a first function for setting the first and second voltage levels and a second function for selecting between the first and second voltage levels.

19. The power management system according to claim 15, wherein the power management application is further configured to determine, based on the execution profile, a nominal high frequency interval length.

20. The power management system according to claim 15, wherein the first voltage level is selected before a transition from the low frequency operating interval to the high frequency operating interval.

* * * * *

UNITED STATES PATENT AND TRADEMARK OFFICE
CERTIFICATE OF CORRECTION

| | | |
|---|---|---|
| PATENT NO. | : 9,141,165 B2 | Page 1 of 1 |
| APPLICATION NO. | : 13/130825 | |
| DATED | : September 22, 2015 | |
| INVENTOR(S) | : Peter Cumming et al. | |

It is certified that error appears in the above-identified patent and that said Letters Patent is hereby corrected as shown below:

In The Claims

In Column 8, Claim 11, line 42, please delete the word "operable" and insert the word --configured--

Signed and Sealed this
First Day of March, 2016

Michelle K. Lee
*Director of the United States Patent and Trademark Office*